3,709,913
N-THIENYLALKYL-β-ALKOXY-TRIFLUORO-
METHYLPHENALKYLAMINES
John J. Lafferty, Levittown, and Charles L. Zirkle,
Berwyn, Pa., assignors to Smith Kline & French Laboratories, Philadelphia, Pa.
No Drawing. Filed Sept. 14, 1970, Ser. No. 72,111
Int. Cl. A61k 27/00; C07d 63/12
U.S. Cl. 260—332.3 R        8 Claims

ABSTRACT OF THE DISCLOSURE

N - thienylalkyl - β - alkoxy-trifluoromethylphenalkylamines having anorectic activity are prepared by condensation of an N-thienylalkylamine with a β-alkoxy-trifluoromethylphenalkyl halide.

---

This invention relates to a novel series of N-thienylalkyl - β - alkoxy-trifluoromethylphenalkylamines which have useful pharmacodynamic activity. More specifically, these compounds have utility as anorectic agents, that is, they produce a significant decrease in body weight accompanied by anorexia with little or no side effects.

The compounds of this invention may be represented by the following structural formula:

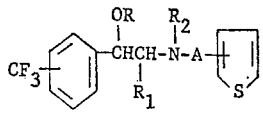

in which

R represents lower alkyl of from 1 to 3 carbon atoms, preferably methyl;

$R_1$ represents hydrogen or methyl;

$R_2$ represents hydrogen or lower alkyl of from 1 to 3 carbon atoms; and

A represents a lower alkylene chain, straight or branched, of from 1 to 3 carbon atoms.

Preferred compounds of this invention are represented by the following structural formula:

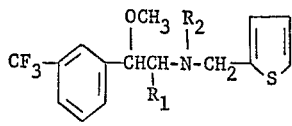

in which $R_1$ and $R_2$ are each hydrogen or methyl.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonic, ethanedisulfonic, acetic, oxalic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, cyclohexylsulfamic, phosphoric and nitric acids.

To prepare the compounds of this invention a trifluoromethyl substituted β-alkoxyphenalkyl halide is condensed with a thienylalkylamine. Conveniently, when a tertiary amino product is desired, an N-alkyl-N-thienylalkylamine and the phenalkyl halide, preferably bromide, are condensed in a nonreactive organic solvent such as benzene, toluene or xylene, in the presence of an alkali metal carbonate, for example potassium carbonate, at reflux temperature for from 4 to 12 hours. When a secondary amino product is desired, the phenalkyl halide is advantageously condensed with an excess of the thienylalkylamine at about 100° C. for from 1 to 3 hours.

Racemic mixtures of the compounds of this invention are thus prepared as a result of the asymmetric substitution of one or more carbon atoms. Such mixtures can be resolved by fractional crystallization of an optically active salt of the amine products. Unless otherwise noted it is intended to include in the structural formulas set forth herein and in the claims, both the racemic mixtures as well as the separated d and l isomers.

The preparation of the appropriately substituted β-alkoxyphenalkyl halides used as starting materials above is described in U.S. Pat. Nos. 3,226,440 and 3,459,803.

The anorectic activity of the compounds of this invention is demonstrated by a standard pharmacological procedure as follows. Compounds are tested orally for their ability to quantitatively reduce first hour food consumption of rats trained to consume their daily food requirements in only six hours. A preferred compound of this invention, N-methyl - N-(2″-thienylmethyl)-β-methoxy-(3′-trifluoromethylphenyl)-ethylamine, has an oral anorectic $ED_{50}$ in rats of 2.6 mg./kg.

Of particular significance is the low sedation potential of compounds of this invention at effective anorectic dose levels. Sedation potential is demonstrated in a confinement motor activity procedure. In this pharmacological procedure, compounds are tested for their ability to induce a graded depression or stimulation of exploratory motor activity of rats maintained in a confined area. The $DD_{50}$ is defined as the dose of compound which causes a 50% decrease in the average 15 minute counts of treated animals below the average 15 minute counts of control animals. The same compound noted above has a $DD_{50}$ of 27.7 mg./kg. The ratio between the confinement motor activity $DD_{50}$ for this compound and its $ED_{50}$ in the rat anorexia test is approximately 10.6 to 1 (27.7/2.6). Large ratios such as this indicate a low potential to produce sedation at anorectic dose levels for compounds of this invention.

To obtain anorectic activity the compounds of this invention may be administered orally or parenterally to an animal organism in conventional dosage unit forms. Preferably a compound or an acid addition salt thereof is administered orally in a tablet or capsule. The dosage units are prepared by incorporating the active medicament in an amount sufficient to produce anorectic activity with a nontoxic pharmaceutical carrier according to accepted procedures. Preferably each dosage unit will contain the active medicament in an amount of about 10 mg. to about 75 mg. Advantageously equal doses will be administered two to four times daily with the daily dosage regimen being about 20 mg. to about 300 mg.

The pharmaceutical carrier employed may be, for example, either a solid or liquid. Exemplary of solid carriers are lactose, terra alba, sucrose, talc, gelatin, agar, pectin, acacia, magnesium, stearate, stearic acid and the like. Exemplary of liquid carriers are syrup, peanut oil, olive oil, water and the like. Similarly the carrier or diluent can include any time delay material well known to the art, such as glyceryl monsterate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension.

The following examples illustrate more specifically how to prepare compounds of this invention. However, as such, they are not to be construed as limiting the scope of the invention as defined in Formulas I and II above.

EXAMPLE 1

A mixture of 5.40 g. (0.0425 m.) of N - methyl - 2-thienylmethylamine, 18 ml. of xylene, 2.94 g. (0.0213 m.) of powdered potassium carbonate and 12.00 g. (0.0425 m.) of β-methoxy - (3' - trifluoromethylphenyl)-ethyl bromide is stirred at reflux (148° C.) for five and one-half hours. The reaction mixture is filtered and the filtrate concentrated under reduced pressure. The residue is vacuum distilled to give the free base, N-methyl-N-(2''-thienylmethyl)-β-methoxy - (3' - trifluoromethylphenyl)-ethylamine, B.P. 105–121.5° C./0.10 mm.; hexamate, M.P. 115–116° C.

Similarly, reaction of N-methyl-2-thienylmethylamine with β-ethoxy-(3-trifluoromethylphenyl)-ethyl bromide as described above yields N-methyl-N-(2''-thienylmethyl)-β-ethoxy-(3'-trifluoromethylphenyl)-ethylamine

EXAMPLE 2

A mixture of 24.10 g. (0.0853 m.) of β-methoxy-(3'-trifluoromethylphenyl)-ethyl bromide and 28.98 g. (0.2560 m.) of 2-thienylmethylamine is stirred and heated at 95–100° C. for two hours. The cooled reaction mixture is made basic with aqueous sodium hydroxide and extracted with ether. The extract is concentrated and the residue is taken up in concentrated hydrochloric acid and ether to give a three-layer system. The upper layer is removed and the remainder is extracted with ether. The combined ether extract is concentrated to give 3-trifluoromethylacetophenone.

The lower two phases are treated with excess aqueous ammonia and extracted with ether. The dried ether extract is concentrated and the residue is vacuum distilled to give the free base, N-(2''-thienylmethyl)-β-methoxy-(3'-trifluoromethylphenyl)-ethylamine, B.P. 117–126° C./0.05 mm.; hydrochloride, M.P. 127–129° C.

EXAMPLE 3

Following the procedure of Example 1, N-methyl-2-thienylmethylamine is reacted with β-methoxy-(2'-trifluoromethylphenyl)-ethyl bromide to give N-methyl-N-(2'' - thienylmethyl)-β-methoxy-(2'-trifluoromethylphenyl)-ethylamine.

Similar reaction with β-methoxy-(4'-trifluoromethylphenyl)-ethyl bromide yields the corresponding N-methyl-N-(2'' - thienylmethyl)-β-methoxy - (4' - trifluoromethylphenyl)-ethylamine.

EXAMPLE 4

Following the procedure of Example 2, 2-thienylethylamine is reacted with 1-methoxy-1-(3'-trifluoromethylphenyl)-2-propyl bromide to give N-(2''-thienylethyl)-1-methoxy-1-(3'-trifluoromethylphenyl)-2-propylamine.

EXAMPLE 5

| Ingredients: | Mg./tablet |
|---|---|
| N - methyl-N - (2'' - thienylmethyl)-β-methoxy-(3' - trifluoromethylphenyl)-ethylamine | 50 |
| Calcium sulfate, dihydrate | 125 |
| Sucrose | 25 |
| Starch | 15 |
| Talc | 5 |
| Stearic acid | 3 |

The sucrose, calcium sulfate and active medicament (as the hydrochloride) are thoroughly mixed and granulated with hot 10% gelatin solution. The wetted mass is passed through a #6 mesh screen directly onto drying trays. The granules are dried at 120° F. and passed through a #20 mesh screen, mixed with the starch, talc and stearic acid, and compressed into tablets.

EXAMPLE 6

| Ingredients: | Mg./capsule |
|---|---|
| N-(2'' - thienylmethyl)-β-methoxy - (3' - trifluoromethylphenyl)-ethylamine | 50 |
| Magnesium stearate | 5 |
| Lactose | 325 |

The active medicament (as the hydrochloride) and other ingredients above are screened through a #40 mesh screen, mixed and filled into #0 hard gelatin capsules.

What is claimed is:
1. A compound of the formula:

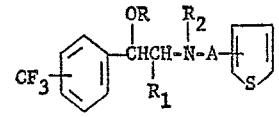

or a pharmaceutically acceptable acid addition salt thereof, in which
R is lower alkyl of from 1 to 3 carbon atoms;
$R_1$ is hydrogen or methyl;
$R_2$ is hydrogen or lower alkyl of from 1 to 3 carbon atoms; and
A is a lower alkylene chain, straight or branched, of from 1 to 3 carbon atoms.

2. A compound according to claim 1 in which the $CF_3$ group is in the meta position.

3. A compound according to claim 2 in which the thiophene ring is 2-substituted.

4. A compound according to claim 3 in which R is methyl.

5. A compound according to claim 4 in which A is methylene.

6. A compound according to claim 5 in which $R_1$ is hydrogen.

7. A compound according to claim 6 in which $R_2$ is methyl, being the compound N-methyl-N-(2''-thienylmethyl)-β-methoxy - (3' - trifluoromethylphenyl)-ethylamine.

8. A compound according to claim 6 in which $R_2$ is hydrogen, being the compound N-(2''-thienylmethyl)-β-methoxy-(3'-trifluoromethylphenyl)-ethylamine.

References Cited

UNITED STATES PATENTS

| 3,226,440 | 12/1965 | Sahyun et al. | 260—570.6 |
| 3,459,803 | 8/1969 | Faust et al. | 260—570.6 |

OTHER REFERENCES

Friedman, "Influence of Isosteric Replacements Upon Biological Activity," Symposium on Chemical-Biological Correlation, Natl. Acad. Sci.—Natl. Research Council, publ. No. 206, Washington, D.C., 1951, p. 295t.

Feldkamp et al., J.A.C.S., vol. 71, pp. 4012–4 (1949).

Blicke et al., J.A.C.S., vol. 66, pp. 1645–8 (1944).

HENRY R. JILES, Primary Examiner

C. M. S. JAISLE, Assistant Examiner

U.S. Cl. X.R.
260—332.2 R; 424—275